3,149,018
FILM-COVERED ARTICLE AND METHOD
OF MAKING SAME
Robert E. Jacobson, Elk Grove Village, Ill., assignor to United States Gypsum Company, Chicago, Ill., a corporation of Illinois
Filed Jan. 29, 1960, Ser. No. 5,447
5 Claims. (Cl. 161—43)

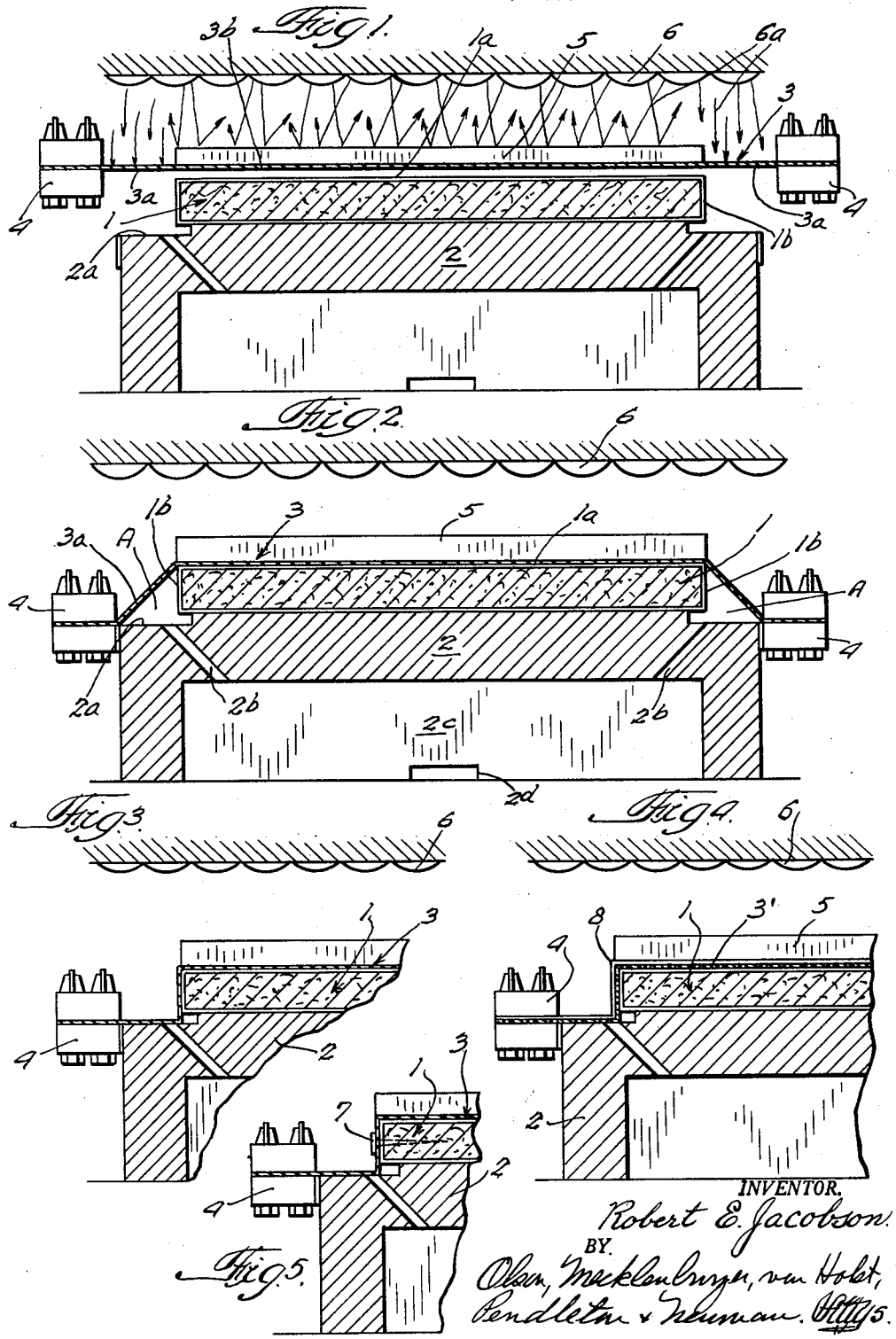

This invention relates to a film-covered article and a method of making same and, more particularly, to a method of applying to a rigid substrate thermoplastic film or membrane having heat-sensitive decoration embossed or etched thereon. Heretofore it has proven highly desirable to provide substrates such as wall panels, acoustic and decorative tile, plywood panels, ceiling board, formboard, roof plank, etc., with plastic films or flexible membranes. Such films have long been considered desirable coverings for many different materials due to their many desirable qualities, such as washability, attractiveness and wear resistance. It has, however, always been extremely difficult to obtain an article wrapped on all its side edges with a thermoplastic membrane having heat-sensitive decoration embossed or etched thereon without destroying, to a large extent, the decoration during the application of the membrane to the article. Due to the destruction of the membrane decoration during its application to the substrate, it has generally been considered impractical to emboss or etch such membranes prior to such application.

It is commonly known that a plastic film or membrane must be applied in a manner which will provide a cover that will remain taut over a long period of time. The desired tautness or tension has, however, been impossible to obtain on a decoratively embossed or etched film without destroying and/or distorting the embossed or etched design.

Heretofore there have been several methods of providing proper tension on plain, undecorated film after the film has been applied to a substrate. One such method has been to attach film to a substrate and thereafter heat the film and substrate, thereby causing the film to shrink to the desired tension. This method, known as a "heat shrink method," was disclosed in Slayter et al. Patent No. 2,802,764, dated August 13, 1957. The heat shrink method, though helpful in obtaining a taut plastic-covered article, has been found impractical to use with membranes having heat-sensitive decoration embossed or etched thereon, because the heat and tension imparted to the film while it is warm would distort and/or destroy the decoration on the film. A heat shrink method also has the inherent disadvantage of being limited to specific films that will shrink bilaterally when heated. Furthermore, as aforementioned, if one attempts to emboss or etch a film subsequent to application to a substrate, the heat, pressure, tension, and resulting dimensional changes in the film and substrate caused by the embossing process would have a tendency to warp and break the substrate and/or tear the film.

It is, therefore, one of the primary objects of my invention to provide a method whereby a flexible membrane carrying a heat-sensitive decoration embossed or etched thereon may be applied to all the side edges and exposed face of a rigid substrate, without distortion and injury to the membrane decorated portion which overlies the exposed substrate during application of the membrane thereto.

Another object is to provide a method whereby a rigid substrate may be provided with a flexible membrane having a heat-sensitive decoration embossed or etched thereon without dimensional changes resulting in the substrate.

Another object is to provide a method whereby a rigid substrate, such as acoustical tile, may be provided with a decorative, flexible membrane without interference with its acoustical efficiency.

Another object is to provide a method whereby a rigid substrate may be provided with a flexible membrane that has a heat-sensitive decoration embossed or etched thereon and which may be perforated either prior or subsequent to application to a substrate.

Another object is to provide a method whereby a flexible membrane having a heat-sensitive decoration embossed or etched thereon may be applied to a substantially rigid substrate, i.e., a substrate that has sufficient strength to withstand normal wrapping pressure in a manner which lends itself to mass production and automation.

Another object is to provide an article of manufacture comprising a substantially rigid substrate having tautly applied thereto a membrane provided with heat-sensitive decoration thereon.

Further and additional objects will appear from the description, accompanying drawing and appended claims.

In accordance with one embodiment of this invention, a method is provided for applying a film to a substantially inflexible substrate. This method includes placing the substrate upon a base member whereby at least the top and side surfaces of the substrate are exposed. Placed in registered superposed relation with respect to the top surface of the substrate is a sheet of thermoplastic material having a heat-sensitive decoration embossed or etched thereon, the area of the sheet being greater than that of the substrate top surface. Arranged in overlying relation on the sheet material, and disposed in substantially coincidental relation with respect to the substrate top surface, is a heat-resistant plate. The marginal portion of the sheet material projects beyond the periphery of the plate and completely surrounds the same. Heat is then applied to only the marginal portion of the sheet, causing the same to become softened. The softened marginal portion of the sheet is then brought into intimate contact with the substrate side surface, while the unheated portion of the sheet is brought into contact with the top surface of the substrate. The marginal portion of the sheet material is then affixed to at least the substrate side surface.

For a more complete understanding of this invention, reference should be made to the drawing, wherein:

FIGURE 1 is a fragmentary diagrammatic sectional view showing the substrate positioned on the base member and the marginal portion of the sheet being heated while the sheet is held in a superposed position above the top surface of the substrate.

FIG. 2 is similar to FIG. 1, but showing the unheated portion of the sheet in contact with the top surface of the substrate and the marginal portion of the sheet in partial enveloping relation with the side surface of the substrate.

FIG. 3 is a cut-away view of FIG. 2, but showing the marginal portion of the sheet brought into intimate contact with the side surface of the substrate.

FIG. 4 is similar to FIG. 3, but showing the utilization of a perforated film in combination with an imperforate dam.

FIG. 5 is similar to FIG. 3, but showing a modified form of the invention wherein the film is mechanically affixed to the substrate side surface.

Referring now to the drawing and, more particularly, to FIG. 1, a substantially rigid substrate 1, such as a piece of plywood, gypsum board, gypsum tile, wood, mineral or vegetable fiberboard, acoustical tile, etc., is shown positioned on the upper surface of a supporting base member 2. The substrate 1, in this instance, is of planar square-cut configuration; however, it is to be understood, of course, that the invention is not to be limited to a substrate of this particular configuration. When the substrate 1 is positioned on the base member 2, it is important that the planar top surface 1a and the delimiting side surface 1b of the substrate be exposed.

Positioned above the top surface 1a, and in registered superposed relation therewith, is a sheet 3 of thin-gauge thermoplastic film or membrane material having a heat-sensitive decoration embossed or etched thereon. The term "embossed," when used hereinafter, is intended to include the term "etched" as well. The sheet 3, in this instance, is maintained in a fairly taut condition by a clamp member 4 which grips the periphery of the sheet.

Disposed above sheet 3, and in substantially coincident relation with respect to top surface 1a of the substrate 1, is a heat-reflective means, such as plate 5. The area of sheet 3 is substantially greater than the area of plate 5 and, therefore, a marginal portion 3a of the sheet projects from the periphery of plate 5. The marginal portion 3a, in this instance, is illustrated as being disposed between the periphery of plate 5 and clamp member 4.

Disposed in spaced relation above plate 5 is a heating element 6, which is adapted to have the heating rays 6a directed downwardly therefrom and toward the plate 5 and the sheet marginal portion 3a. Because of the heat-reflective and resistive characteristics of plate 5, the heating rays do not reach the portion 3b of the sheet subtending plate 5 and thus do not deleteriously affect the decorative embossed designs on portion 3b, as this portion of the sheet remains relatively cool. It is the surface 3b of the sheet material which is exposed to view when the finished product is installed. The marginal portion 3a, on the other hand, is directly contacted by such heating rays for a predetermined length of time and, therefore, because of the heat-sensitive character of the thermoplastic material of which the sheet is formed, the marginal portion 3a becomes softened.

Other means may be employed to effect heating of the marginal portion 3a; for example, hot air or steam may be directed through a plurality of nozzles, not shown, onto the marginal portion 3a. If the means employed for heating the marginal portion 3a is positioned in close proximity to the marginal portion, and the heat produced thereby is confined to a given area by reason of the shape of the nozzles, then, in some instances, the plate 5 might be omitted. While plate 5 is shown to be separate from the heating element 6, it may, if desired, be affixed to the heating element itself, in which case the heat-radiating means of element 6 would merely delimit the plate 5.

When the softened condition of the sheet has occurred, the heating means is de-energized and then either the clamp member 4 is moved downwardly toward the substrate top surface 1a, or the base member is moved upwardly toward the sheet 3. Normally the plate 5 will remain stationary; however, it may be of a type which will move downwardly with the sheet. The clamp member 4, in the illustrated embodiment, continues its downward movement beneath the plane of top surfaces 1a until the gripped peripheral portion of the sheet is coplanar with the surface portion 2a of the supporting member 2 and forms an air-tight triangularly-shaped pocket A with the side surface 1b of the substrate and the portion 2a of member 2 (see FIG. 2). Because of the softened condition of sheet marginal portion 3a due to heating thereof, the latter is capable of being stretched or elongated without any tear or break occurring in the sheet as it is brought past the edge of the substrate, said edge being formed by the intersection of the top surface 1a and side surface 1b.

It will be noted in FIG. 2 that the surface portion 2a of base member 2 is provided with a plurality of passageways 2b, the upper end of each terminating adjacent the side surface 1b of the substrate 1. The lower end of each passageway 2b, on the other hand, terminates in a cavity 2c formed in the base member and in which a vacuum may be drawn through port 2d.

As soon as clamp member 4 has reached the position shown in FIG. 2, and mechanical tension is exerted on the film, a control (not shown) is actuated, causing a vacuum to be drawn in cavity 2c. When this condition occurs, the marginal portion 3a, due to pressure differential on opposite sides thereof, collapses or is deformed, as shown in FIG. 3, and overlies and is brought into intimate contact with the substrate side surface 1b. The aforementioned mechanical tension helps prevent wrinkles in the film.

While the base member 2 is illustrated with only passageways 2b formed adjacent the periphery of substrate 1, it is to be understood, of course, that additional passageways may be provided in the portion of the base member in contact with the substrate or, on the other hand, the supporting base member may be formed, in part at least, from a porous material. With this arrangement, therefore, and the substrate 1 being formed of an air-pervious material, the sheet portion 3b will be brought into intimate contact with the substrate top surface 1a when a vacuum is drawn within the base member cavity 2c.

To enable the sheet marginal portion to be responsive to a vacuum, without causing a rupture or tear in the sheet, it has been found that good results have been obtained with sheet material possessed of a 100% elongation characteristic when heated to its forming temperature. On the other hand, with available sheet material, it is doubtful whether satisfactory results can be attained where the elongation characteristic of the material is much below 50% when heated to its forming temperature. By "forming temperature" is meant the temperature at which a thermoplastic film will attain optimum elongation without rupture.

Once the sheet marginal portion 3a has assumed the condition shown in FIG. 3, and a segment thereof is in intimate contact with substrate side surface 1b, a further means must be utilized for affixing such segment to the substrate. This may be accomplished, in the preferred embodiment, by a suitable adhesive being applied, either to the underside of sheet 3 when it is in the position shown in FIG. 1, and/or the surfaces of the substrate to be engaged by the film. In a modified form the sheet marginal portion 3a may be mechanically affixed to the substrate side by a nail or staple 7 (see FIG. 5). In any case, when the sheet is brought into intimate contact with the substrate, the adhesive or mechanical means will retain the sheet in such intimate contact.

The excess peripheral and marginal portions of the sheet may be removed by cutting, trimming, or the like.

The side surfaces of adjoining tile or panels are normally disposed in abutting relation and thus the fact that the embossing or etching in the marginal portion of the sheet has become impaired by the applied heat is not important because such marginal portion is not exposed when the finished product is installed. In addition, by having the decorative design removed, or substantially so, from the marginal portion of the sheet upon application of heat, the adhesive affixing of the marginal portion to the side of the substrate is facilitated.

Where it is desired to have the film perforate, the applied film 3' may be either perforated in the desired manner before the sheet is accommodated by the clamp member 4 (see FIG. 4), or the substrate may be passed through perforating rolls subsequent to the film being applied to the substrate.

In instances where a vacuum is employed to bring the perforate sheet into intimate contact with the surfaces of the substrate, an imperforate membrane, known as a dam 8, must be utilized. The dam is of a size and shape as sheet 3' and is placed in overlying relation with respect to the sheet when the latter is in the relative position shown in FIG. 1. Normally the dam 8 is placed between the sheet 3' and the plate 5; however, if desired, the dam can also overlie the plate 5. The dam should be of a material such as synthetic rubber or the like that does not resist passage of the heat rays but, at the same time, is not itself adversely affected by the heat rays. After the marginal portion of the sheet has been brought into intimate contact with the substrate, and before the excess amount of the sheet is trimmed from the substrate, the dam is removed and is capable of being used over again.

While the utilization of a vacuum to effect intimate contact between the sheet and substrate has been suggested, the invention is not limited thereto, as air-pressure or mechanical means, the latter being by way of pressure plates or the like, might be employed to perform the same function. As to the utilization of air pressure, an air-impervious bonnet or hood might be employed which encloses the various elements heretofore described in relation to the vacuum system, except that the cavity formed in the substrate support is opened to the atmosphere. A super-atmospheric pressure is introduced into the bonnet interior, subsequent to sheet material marginal portion being softened by the application of heat, and the substrate and sheet material being moved relative to one another into engagement. Once pressure is introduced into the bonnet interior, the entire sheet is urged into intimate contact with the exposed substrate surfaces.

To facilitate understanding of the inventive concept, several examples are set forth hereinafter:

Example 1

A section of gypsum board is provided with a heat-activatable adhesive compound comprising butadiene acrylonitrile synthetic rubber, phenolic resin and a chlorinated natural rubber with methyl ethylketone and hydrocarbon solvents applied to the top and side surfaces thereof. The gypsum board substrate is placed on a base member with the adhesively coated surfaces exposed. A piece of 2 mil calendered thermoplastic film containing 80% polyvinyl chloride homopolymer and 20% polymethyl methacrylate, with heat-sensitive embossing thereon, is suspended in clamp members above the top surface of the gypsum board. A heat-reflective plate of the same size as the gypsum board top surface is placed over the film and in coincident relation with the top surface. A heating element that is of greater dimension than the gypsum board top surface is energized to approximately 900° F. for approximately eleven (11) seconds, whereupon the marginal portion of the film is heated to a temperature in the order of 250 to 300 degrees Fahrenheit. The clamp members holding the peripheral portion of the film are lowered relative to the gypsum board top surface, to a point where a part of the marginal portion of the film contacts the peripheral portion of the base member and forms an air-tight, triangularly-shaped pocket (see FIG. 2) with the base member and the adhesively coated side surface of the gypsum board. A vacuum source is activated, causing the marginal and central portion of the film to be drawn into intimate contact with the gypsum board side and top surfaces, respectively, and adhesively affixed thereto by means of the adhesive, aforedescribed, applied to such board surfaces.

Example 2

A section of acoustic tile is provided with a heat-activatable solvent-based adhesive, said adhesive comprising a synthetic rubber compounded with a phenolic resin, applied to the side surfaces thereof. The acoustic tile is placed on a base member with the adhesively coated surfaces exposed. A piece of 4 mil extruded polypropylene film with heat-sensitive embossing thereon, is suspended in clamp members above the top surface of the acoustic tile. A heat-reflective plate of the same size as the acoustic tile top surface is placed over the film and in coincident relation with the top surface of the tile. A heating element that is of greater dimension than the acoustic tile top surface is energized to approximately 900° for approximately sixteen (16) seconds, whereupon the marginal portion of the film is heated to a temperature in the order of 300 to 350 degrees Fahrenheit. The clamp members holding the peripheral portion of the film are lowered relative to the acoustic tile top surface, to a point where a part of the marginal portion of the film contacts the peripheral portion of the base member and forms an air-tight, triangularly-shaped pocket (see FIG. 2) with the base member and the adhesively coated side surface of the tile. A vacuum source is activated, causing the marginal and central portions of the film to be drawn into intimate contact with the tile side and top surfaces, respectively, and adhesively affixed to the side surfaces by means of the adhesive, aforedescribed, applied to such tile side surfaces.

Example 3

A section of formboard is placed on a base member. A piece of 1.5 mil nonlinear polyethylene film with heat-sensitive embossing thereon is suspended in the clamp members above the top surface of the formboard. A heat-reflective plate of the same dimensions as the formboard top surface is placed over the film and in coincident relation with the top surface. A heating element that is of greater dimension than the formboard top surface is energized to approximately 900° F. for about six (6) seconds, whereupon the marginal portion of the film is heated to a temperature in the order of 200 to 225 degrees Fahrenheit. The clamp members holding the peripheral portion of the film are lowered relative to the formboard top surface, to a point where a part of the marginal portion of the film contacts the peripheral portion of the base member and forms an air-tight, triangularly-shaped pocket (see FIG. 2) with the base member and the side surfaces of the formboard. A vacuum source is activated, causing the marginal and central portion of the film to be drawn into intimate contact with the formboard side and top surfaces, respectively, and mechanically affixed thereto by means of a tack strip.

Example 4

A section of wall panel is provided with a suitable rubber-base adhesive applied to side and top surfaces. The wall panel is placed on a base member with the adhesively coated surfaces exposed. A piece of 5 mil perforated Videne film (a polyester copolymer sold under the trademark "Videne") with heat-sensitive embossing thereon, is suspended by means of clamp members above the top surface of the wall panel. A flexible dam formed of a heat-transmitting rubber material is placed in overlying relation with the film. A heat-reflective plate of the same dimensions as the wall panel top surface is placed over the film and in coincident relation with the top surface. A heating element that is of greater dimension than the wall panel top surface is energized to approximately 900° F. for about fourteen (14) seconds, whereupon the marginal portion of the film is heated to a temperature in the order of 300 to 350 degrees Fahrenheit. The base member with the wall panel section disposed thereon is moved upwardly toward the clamped film to a point where a part of the marginal portion of the film contacts the peripheral portion of the base member and forms an air-tight, triangularly-shaped pocket (see FIG. 2) with the base member and the side surfaces of the wall panel. A vacuum source is activated, causing the marginal and central portion of the film to be drawn into intimate contact with the wall panel side and top surfaces and adhesively affixed to the side surfaces by means of the aforementioned adhesive applied to the side and top surfaces of the wall panel.

The film temperatures in all of the aforenoted examples were obtained by powdered deposits of "Templestik" temperature-sensitive wax crayons, these crayons having predetermined melting points.

The examples have shown how a few of the many thermoplastic films may be utilized in my invention, and are mentioned in an illustrative sense only. It is obvious that many other thermoplastic films (i.e., various other polyester, polyethylene and acrylic polymers, vinylchloride polymers, styrene polymers and various mixtures of these polymers) can be used by making slight changes in heat exposure time and thickness of film. Modifications, such as the appropriate adhesive for the specific film used, sizing, and the like, are changes that are obvious to those skilled in the art of plastic films.

The amount of vacuum used by the invention may, of course, be varied in a very wide latitude, as is well understood by those skilled in the art of vacuum-forming. The measured vacuum required will be affected somewhat by the size of the cavity in which the vacuum is drawn, among other things. In the embodied illustrations, good results have been obtained with as little as two inches of mercury vacuum.

Similar considerations are applicable where superatmospheric pressures are utilized.

While the invention to this point has been described in relation to heat-sensitive decorations of the embossed or etched type, this was done for illustrative purposes only and to facilitate understanding of the invention. It is to be understood that the invention is applicable generally to plastic films of various gauges and provided with heat-sensitive decorations of which heat unstable coloring materials are an example.

Thus, it will be seen that a film-covered article and a method of making same has been provided, in which the utility and appearance of the article have been materially enhanced. Furthermore, the method is simple and expedient, and permits the application of an embossed or etched film without causing any distortion of the surface of the film which is to be exposed when the finished article is installed. In addition, the method does not deleteriously affect the substrate material.

While several embodiments of this invention have been shown above, it will be understood, of course, that the invention is not to be limited thereto, since many further modifications may be made, and it is contemplated, therefore, by the appended claims, to cover any such modifications as fall within the true spirit and scope of this invention.

I claim:

1. An article of the class described, comprising a substantially inflexible substrate and a thermoplastic film having a heat-sensitive decoration thereon, said film overlying in taut condition at least one surface of said substrate and the side surfaces of said substrate delimiting said one surface; the portion of said film overlying said side surfaces being in a stretched condition and in intimate contact with said side surfaces, said film portion overlying said one surface of said substrate being flexible, whereby the acoustical efficiency is preserved, and being in a dimensionally unchanged condition, so that said heat-sensitive decoration is undistorted.

2. A method of applying a film having a heat-sensitive decoration thereon to a substantially inflexible substrate, said method comprising placing such substrate upon a base member whereby at least the side and top surfaces of such substrate are exposed, spacing a sheet of thermoplastic material having a heat-sensitive decoration thereon from said substrate whereby a central portion of said sheet is disposed in spaced, substantially coincident relation with respect to said substrate top surface and said sheet central portion is delimited by a continuous marginal portion, applying heat to only said sheet marginal portion whereby the latter becomes softened, bringing said sheet central portion into contact with said substrate upper surface and bringing the softened marginal portion into contact with a perimetric base member portion outwardly spaced from said substrate, concomitantly stretching said sheet softened marginal portion and placing the entire sheet under tension in the course of effecting said latter sheet-substrate contact; the entire heat-sensitive decoration being undistorted in the course of effecting said latter contact, and urging pressure against said softened marginal portion to bring said marginal portion into intimate contact with said substrate side portions.

3. A method of applying a film having a heat-sensitive decoration thereon, to a substantially inflexible substrate, said method comprising placing said substrate upon a base member whereby at least the side and top surfaces of such substrate are exposed, spacing a sheet of thermoplastic material having heat-sensitive decoration thereon from said substrate whereby a central portion of said sheet is disposed in spaced, substantially coincident relation with respect to said substrate top surface and said sheet central portion is delimited by a continuous marginal portion, applying heat to only said sheet marginal portion whereby the latter becomes softened, bringing said sheet central portion into contact with said substrate upper surface and bringing a part of the softened marginal portion into contact with a perimetric base member portion outwardly spaced from said substrate, said sheet forming an air-tight chamber with said perimetric base portion, concomitantly stretching said sheet softened marginal portion and placing said sheet under tension in the course of effecting said latter sheet-substrate contact, said heat sensitive decoration remaining undistorted in the course of effecting said latter contact, and withdrawing the atmosphere from said airtight chamber whereby said sheet softened marginal portion is brought into intimate contact with said substrate side portions.

4. A method of applying a film having a heat-sensitive decoration thereon, to a substantially inflexible substrate, said method comprising placing such substrate upon a base member whereby at least the side and top surfaces of such substrate are exposed, spacing a sheet of thermoplastic material having a heat-sensitive decoration thereon from said substrate, applying heat to only a marginal portion of said sheet surrounding a sheet central portion of substantially the same area-defining dimensions as said substrate top surface whereby the marginal portion becomes softened, bringing said sheet central portion into contact with said substrate upper surface and fixedly positioning said softened marginal portion in surrounding relationship relative to the perimeter of said substrate, concomitantly stretching said sheet marginal portion and placing the entire sheet under tension in the course of effecting said latter sheet-substrate relationship, said heat-sensitive decoration being undistorted in the course of effecting said latter contact; and urging pressure against said softened marginal portion to bring said marginal portion into intimate contact with said substrate side portions.

5. A method of applying a film having a heat-sensitive decoration thereon, to a substantially inflexible substrate, said method comprising placing such substrate upon a base member whereby at least the side and top surfaces of such substrate are exposed, spacing a sheet of thermoplastic material having heat-sensitive perforations formed therein from said substrate whereby a central portion of said sheet is disposed in spaced, substantially coincident relation with respect to said substrate top surface and said sheet central portion is delimited by a continuous marginal portion, applying heat to only said sheet marginal portion whereby the latter becomes softened, bringing said sheet central portion into contact with said substrate upper surface and bringing said softened marginal portion into contact with a perimetric base member portion outwardly spaced from said substrate, placing an imperforate dam in overlying relationship with said sheet, concomitantly stretching said sheet softened marginal portion and placing the entire sheet under tension in the course of effecting the sheet-substrate contact, and urging pressure against the overlying dam and said sheet softened marginal portion to bring said edge portions into intimate contact with said substrate side portions.

References Cited in the file of this patent

UNITED STATES PATENTS

| | | |
|---|---|---|
| 2,402,631 | Hull | June 25, 1946 |
| 2,441,097 | Hicks | May 4, 1948 |
| 2,595,734 | Toulmin | May 6, 1952 |
| 2,655,959 | Gordon et al. | Oct. 13, 1953 |
| 2,802,764 | Slayter et al. | Aug. 13, 1957 |
| 2,828,799 | Harrison | Apr. 1, 1958 |
| 3,067,082 | Leigh | Dec. 4, 1962 |